G. P. BROWNING.
CLEVIS.
APPLICATION FILED JAN. 5, 1911.
1,037,589.
Patented Sept. 3, 1912.
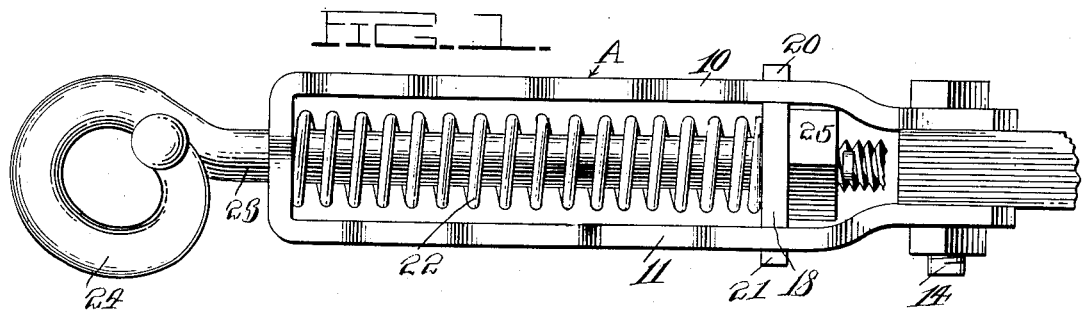
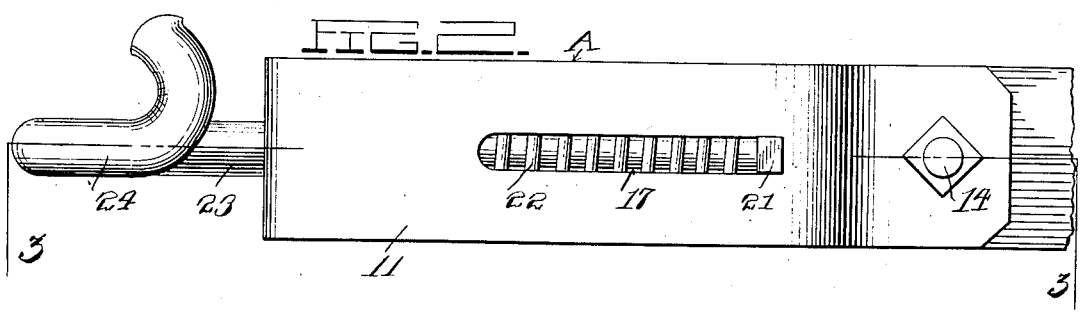
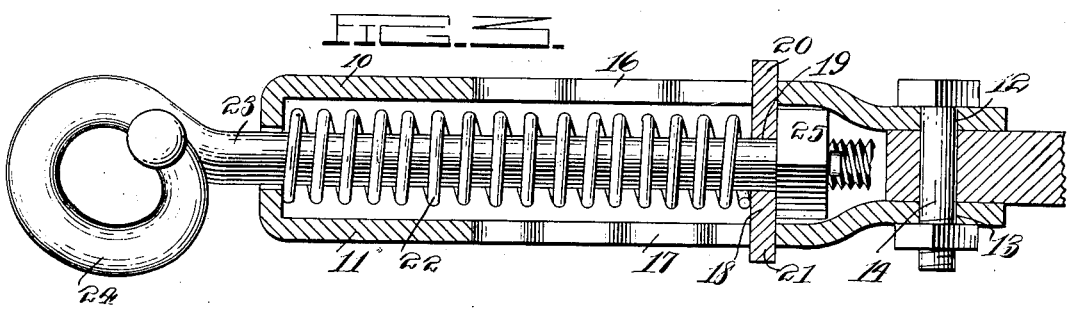
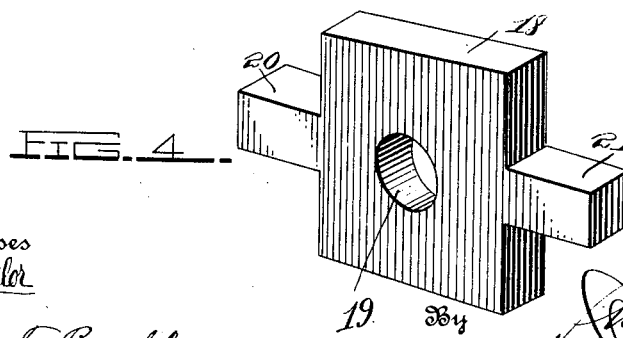
Witnesses
P. W. Taylor
Henry T. Bug Jr
Inventor
George P. Browning.
By
Attorneys

UNITED STATES PATENT OFFICE.

GEORGE P. BROWNING, OF FLINT HILL, VIRGINIA.

CLEVIS.

1,037,589.   Specification of Letters Patent.   Patented Sept. 3, 1912.

Application filed January 5, 1911. Serial No. 600,863.

*To all whom it may concern:*

Be it known that I, GEORGE P. BROWNING, a citizen of the United States, residing at Flint Hill, in the county of Rappahannock, State of Virginia, have invented certain new and useful Improvements in Clevises; and I do hereby declare the following to be a full, clear, and exact description of the invention, such as will enable others skilled in the art to which it appertains to make and use the same.

This invention relates to clevises.

The object of the invention resides in the provision of a clevis which will form a suitable connection between the plow and the draft animals, whereby breakage of the plow parts is prevented when an abnormal obstruction is encountered.

A further object of the invention resides in the provision of a clevis which will be simple in construction, durable, efficient in use, and which may be manufactured at an exceedingly small cost.

With these and other objects in view, the invention consists in the details of construction and in the arrangement and combination of parts to be hereinafter more fully described and particularly pointed out in the appended claim.

In describing the invention in detail, reference will be had to the accompanying drawings, wherein like characters of reference denote corresponding parts in the several views; and in which, Figure 1 is a plan view of the clevis showing the same secured to the forward end of the plow beam; Fig. 2, a side elevation of what is shown in Fig. 1; Fig. 3, a section on the line 3—3 of Fig. 2; and, Fig. 4, a detail perspective view of the follower block.

Referring to the drawings, the clevis is shown as comprising a U-shaped frame A which includes spaced arms 10 and 11. These arms are bent toward each other at the free ends and are provided with alining apertures 12 and 13, through which a bolt 14 is passed to detachably secure the frame A to the forward end of the plow beam. The arms 10 and 11 are further provided with longitudinal slots 16 and 17 respectively for a purpose that will presently appear. Slidably mounted between the arms 10 and 11 is a follower block 18 provided with a central aperture 19 and having lateral extensions 20 and 21 which project through the slots 16 and 17, respectively, said extensions being adapted to engage opposite ends of said slots and thereby limit the movement of the follower block longitudinally of the arms 10 and 11. Disposed between the bight portion of the frame A and the follower block 18 is a coil spring 22 which serves to normally maintain the follower block 18 at the rear end of the slots 16 and 17. Passing through the bight portion of the frame A and through the coil spring 22 and the follower block 18 is a draw bar 23 which has its forward end bent as at 24 to form attaching means for a doubletree and its rear end threaded for the reception of a nut 25, this nut serving to prevent the disengagement of the draw bar from the follower block when the draft is applied to the former. The nut also serves to minimize shock and prevent breaking off of the extensions 20 and 21 by contacting with the inwardly bent terminals of the U-shaped frame when the follow plate is snapped back by the spring after each compression of the spring, as clearly shown in Fig. 3.

By this construction it will be apparent that when the plow to which the clevis is secured encounters an abnormal obstruction, the spring 22 will be compressed, and the likely breaking of the plow point or other component parts of the plow prevented. It will also be noted that this yielding effect of the spring will likewise serve to prevent the breaking of the traces and swingletrees and obviate the grinding of the harness on the shoulders of the animals when working on hard ground.

What is claimed is:

A clevis including a U-shaped frame having the terminals of the sides bent inwardly and equipped with attaching means, said sides being formed with longitudinal slots, a follow plate slidably fitted between the sides and having extensions projecting through said slots and limited in movement by contact with the end walls of said slots, a helical spring disposed between the bight of the frame and the follow plate, a draw bar extending through the bight of the frame, through said spring, and through an orifice in said follow plate, and a nut on said draw bar bearing against said follow plate and adapted to contact with the inwardly-bent terminals of said sides when said spring expands to inactive position after actuation whereby to lessen shock on said extensions as the latter contact with the ends of said slots nearest to said inwardly bent ends.

In testimony whereof, I affix my signature, in presence of two witnesses.

GEORGE P. BROWNING.

Witnesses:
W. A. TROUT,
MARVIN A. TROUT.